United States Patent
Sebastian et al.

(10) Patent No.: US 11,038,601 B2
(45) Date of Patent: Jun. 15, 2021

(54) APPARATUS AND METHOD FOR CALIBRATING ANALOG PHASED ANTENNA ARRAY

(71) Applicant: Samsung Electronics Co., Ltd., Gyeonggi-do (KR)

(72) Inventors: Joyson Sebastian, Cypress, CA (US); Pranav Dayal, San Diego, CA (US); Kee-Bong Song, San Diego, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/661,606

(22) Filed: Oct. 23, 2019

(65) Prior Publication Data
US 2020/0336221 A1  Oct. 22, 2020

Related U.S. Application Data

(60) Provisional application No. 62/835,595, filed on Apr. 18, 2019.

(51) Int. Cl.
*H04B 17/10* (2015.01)
*H01Q 21/06* (2006.01)

(52) U.S. Cl.
CPC .......... *H04B 17/102* (2015.01); *H01Q 21/06* (2013.01)

(58) Field of Classification Search
CPC .......... H01Q 21/22; H01Q 3/36; H01Q 19/17; H01Q 25/00; H01Q 25/002; H01Q 5/321; H01Q 3/267; H01Q 3/2676; H01Q 3/24; H01Q 21/00; H01Q 21/06; H04W 72/085; H04W 56/0035; H04L 27/261
See application file for complete search history.

(56) References Cited

U.S. PATENT DOCUMENTS

| | | | | |
|---|---|---|---|---|
| H375 H | * | 11/1987 | Dinger | H01Q 3/28 342/372 |
| 6,496,140 B1 | * | 12/2002 | Alastalo | H01Q 3/267 342/174 |
| 6,690,952 B2 | | 2/2004 | Nishimori et al. | |
| 7,969,358 B2 | * | 6/2011 | Martin | H04B 7/0848 342/368 |
| 7,994,980 B2 | | 8/2011 | Son et al. | |

(Continued)

FOREIGN PATENT DOCUMENTS

| | | |
|---|---|---|
| WO | WO 2017044528 | 3/2017 |
| WO | WO 2017184314 | 10/2017 |

OTHER PUBLICATIONS

S. Mano and T. Katagi, "A method for measuring amplitude and phase of each radiating element of a phased array antenna," Electronics and Communications in Japan . . . (Part I: Communications), vol. 65, pp. 58-64, 1982.

(Continued)

*Primary Examiner* — Lana N Le
(74) *Attorney, Agent, or Firm* — The Farrell Law Firm, P.C.

(57) ABSTRACT

A method and an apparatus are provided. The method includes (a) turning on an antenna of an antenna array, wherein other antennas of the antenna array are turned off; (b) measuring power for the antenna at each phase of a phase array; (c) repeating step (b) for each antenna of the antenna array; and (d) estimating gain errors based on the measured power for each antenna of the antenna array at each phase of the phase array.

16 Claims, 12 Drawing Sheets

(56) References Cited

U.S. PATENT DOCUMENTS

| | | | |
|---|---|---|---|
| 9,113,346 | B2 | 8/2015 | Pivit et al. |
| 9,379,826 | B2 | 6/2016 | Langer et al. |
| 9,397,766 | B2 | 7/2016 | Puzella et al. |
| 10,003,129 | B2 | 6/2018 | Wang et al. |
| 10,090,940 | B2 | 10/2018 | O'Keeffe et al. |
| 2008/0153433 | A1 | 6/2008 | Pallonen et al. |
| 2014/0232596 | A1* | 8/2014 | Apker ............... G01S 19/23 342/357.62 |
| 2017/0310004 | A1* | 10/2017 | Swirhun ............... H01Q 3/28 |
| 2018/0062260 | A1* | 3/2018 | Khalil ............... H04B 17/12 |
| 2018/0234120 | A1* | 8/2018 | Gharavi ............... H04B 7/0408 |
| 2018/0287568 | A1* | 10/2018 | Malik ............... H04L 25/0206 |
| 2018/0329017 | A1* | 11/2018 | Morita ............... H04W 4/80 |
| 2019/0020119 | A1* | 1/2019 | Laxminarayana ..... H01Q 25/00 |
| 2019/0044628 | A1* | 2/2019 | Morita ............... G01R 29/0892 |
| 2019/0089434 | A1* | 3/2019 | Rainish ............... H04B 7/086 |
| 2020/0076515 | A1* | 3/2020 | Jain ............... H04B 17/13 |
| 2020/0209296 | A1* | 7/2020 | Kong ............... G01R 29/0878 |
| 2020/0295853 | A1* | 9/2020 | McMorrow ........... H04B 17/102 |

OTHER PUBLICATIONS

N. Kojima, K. Shiramatsu, I. Chiba, T. Ebisui and N. Kurihara, "Measurement and evaluation techniques for an airborne active phased array antenna," in Proceedings of . . . International Symposium on Phased Array Systems and Technology, 1996.

T. Takahashi, Y. Konishi, S. Makino, H. Ohmine and H. Nakaguro, "Fast measurement technique for phased array calibration," IEEE Transactions on Antennas and Propagation, . . . vol. 56, pp. 1888-1899, 2008.

K.-M. Lee, R.-S. Chu and S.-C. Liu, "A built-in performance-monitoring/fault isolation and correction (PM/FIC) system for active phased-array antennas," IEEE transactions . . . on antennas and propagation, vol. 41, pp. 1530-1540, 1993.

G. A. Hampson and A. B. Smolders, "A fast and accurate scheme for calibration of active phased-array antennas," in Antennas and Propagation Society International Symposium, . . . 1999. IEEE, 1999.

* cited by examiner

Code:

Reference for measurement

Previously measured

Currently measured

FIG. 11

APPARATUS AND METHOD FOR CALIBRATING ANALOG PHASED ANTENNA ARRAY

PRIORITY

This application claims priority under 35 U.S.C. § 119(e) to a U.S. Provisional Patent Application filed on Apr. 18, 2019 in the United States Patent and Trademark Office and assigned Ser. No. 62/835,595, the entire contents of which are incorporated herein by reference.

FIELD

The present disclosure relates generally to wireless communication systems, and more particularly, to an apparatus and method for calibrating an analog phased antenna array.

BACKGROUND

In an antenna array system, an overall radiation pattern may be steered in an intended direction by applying a certain set of phases on each antenna, based on knowledge of a geometry of the antenna array. The set of phases for all antennas for a particular steering direction may be referred to as a codeword and a set of codewords for several directions may be referred to as a phase array codebook. While a phase array codebook may be designed for an ideal array, there may be an additional unknown phase error and gain error associated with each antenna due to layout and circuit imperfections. Such errors may cause a radiation pattern of an antenna array to be different from an intended radiation pattern for each codeword, thereby affecting the overall coverage. Therefore, antennas may be calibrated to have a correct beam pattern per codeword, which essentially refers to learning the gain and phase errors. Typically, such errors are independent of the applied phases (i.e., codewords). Typical methods for calibrating antennas focus on scenarios in which errors are dependent only on the antenna and not on the phase applied. For example, a rotating-element electric field vector method and a phase toggle method provide calibration of antennas when errors are independent of phase applied. However, in analog beamforming, the errors may be dependent on the phases applied on the antennas.

SUMMARY

According to one embodiment, a method is provided. The method includes (a) turning on an antenna of an antenna array, wherein other antennas of the antenna array are turned off; (b) measuring power for the antenna at each phase of a phase array; (c) repeating step (b) for each antenna of the antenna array; and (d) estimating gain errors based on the measured power for each antenna of the antenna array at each phase of the phase array.

According to one embodiment, an apparatus is provided. The apparatus includes a controller configured to a power meter; and a controller configured to (a) turn on an antenna of the antenna array, wherein other antennas of the antenna array are turned off; (b) control the power meter to measure power for the antenna at each phase of a phase array; (c) repeat step (b) for each antenna of the antenna array; and (d) estimate gain errors based on the measured power for each antenna of the antenna array at each phase of the phase array.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 11 is an illustration of selecting candidate codewords for a certain direction, according to one embodiment.

DETAILED DESCRIPTION

Figure 1:
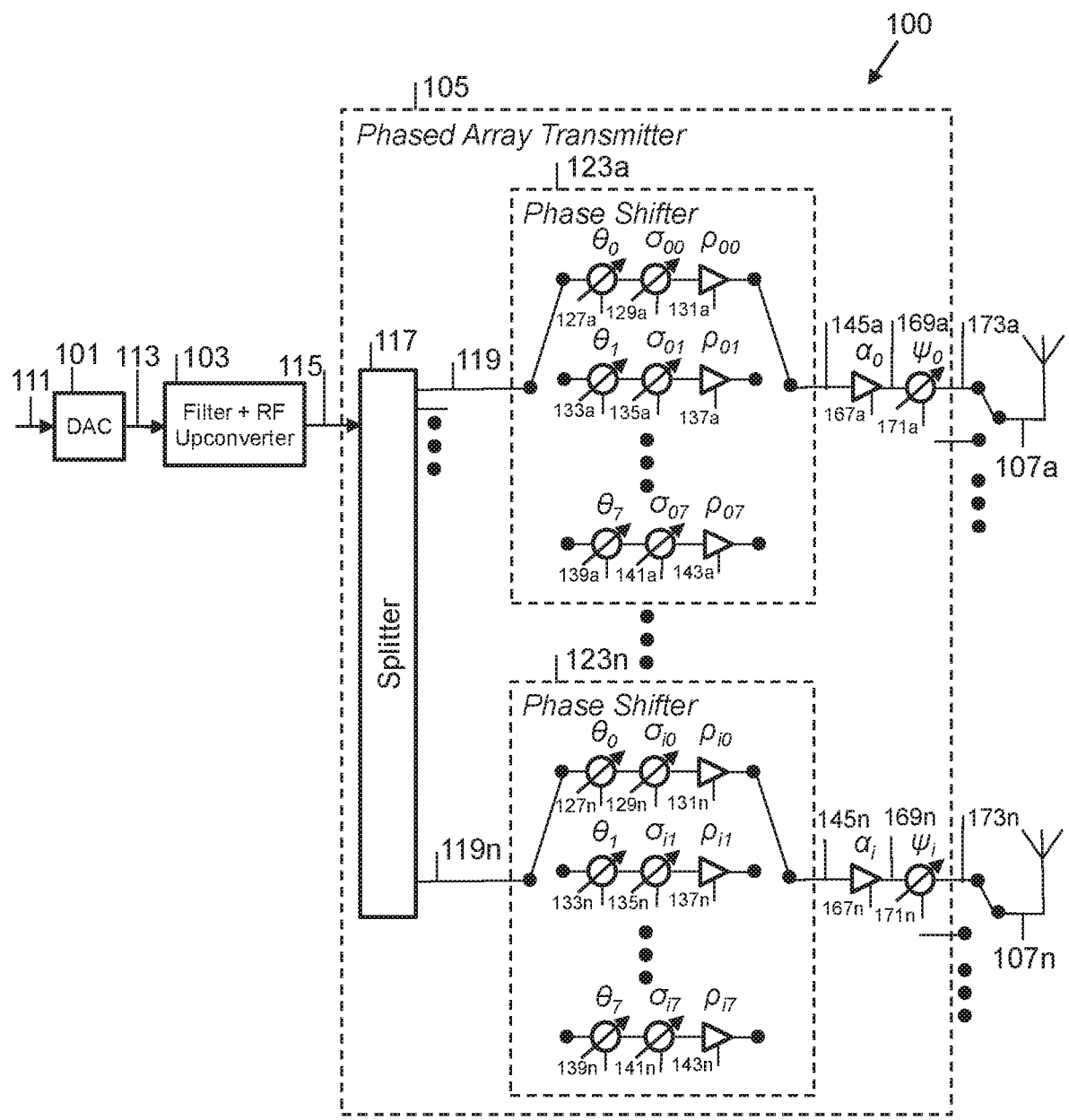
FIG. 1 illustrates an exemplary block diagram of an error model of an antenna array, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, the present disclosure is not limited to the described embodiments, but includes all modifications, equivalents, and alternatives within the scope of the present disclosure.

Although the terms including an ordinal number such as first, second, etc., may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, but are not to be interpreted to have ideal or excessively formal meanings unless clearly defined in the present disclosure.

According to one embodiment, an apparatus and method estimates phase dependent errors on an antenna array by selectively turning on antennas in the antenna array with certain phases on the antennas and measuring power received only in a boresight direction. The apparatus and method further perform calculations on the power measurements to obtain error values. The error values may be used to adjust or update a phase array codebook for application to a phase array that has impairments.

According to one embodiment, an apparatus includes an antenna array with N elements, where N is a positive integer. For example, the antenna array has greater than two elements. The phase level is quantized with Q bits, where Q is a positive integer, hence the possible phases on the antennas are $$\left\{0, \frac{\pi}{2^{Q-1}}, \ldots, \frac{(2^Q-1)\pi}{2^{Q-1}}\right\}.$$

For example, the phase level is quantized with one or more bits. The output from the ith antenna is received in the boresight direction as in Equation (1):

$$\sqrt{P}\alpha_i \rho_{ik} e^{1j \cdot (\psi_i \theta_k + \sigma_{ik})} \quad (1)$$

where P is a power, $\theta_k$ is a phase applied, and $\psi_i, \alpha_i, \rho_{ik}$, and $\sigma_{ik}$ are error terms. The error terms $\psi_i$ and $\alpha_i$ depend only on the antenna, but the error terms $\rho_{ik}$ and $\sigma_{ik}$ depend on both the antenna and the phase used. The error terms $\alpha_i$ and $\rho_{ik}$ on power are real and positive.

FIG. 1 illustrates an exemplary block diagram of an error model for an antenna array, according to one embodiment.

Referring to FIG. 1, an antenna array 100 includes a digital-to-analog converter (DAC) 101, a filter and radio frequency (RF) upconverter 103, a phased array transmitter 105, and n antennas 107a to 107n, where n is a positive integer, that correspond to n phase shifters 123a to 123n in the phased array transmitter 105. It is appreciated that any number of phase shifters corresponding to antennas may be used without deviating from the scope of the present disclosure.

The DAC 101 includes an input 111 for receiving a digital signal and an output 113 for outputting an analog version of the received digital signal.

The filter and RF upconverter 103 includes an input connected to the output 113 of the DAC 101 and an output 115.

The phased array transmitter 105 includes an input connected to the output 115 of the filter and RF upconverter 103 and a number of outputs 173a to 173n, which are equal to the number of phase shifters 123a to 123n in the phased array transmitter 105, elements for modeling error terms $\alpha_o$ 167a to $\alpha_i$ 167n, and elements for modeling error terms $\theta_0$ 171a to $\psi_i$ 171n.

The phased array transmitter 105 includes a splitter 117, a number of the phase shifters 123a to 123n. The phase shifter 123a includes elements for modeling phases $\theta_0$ to $\theta_k$ 127a, 133a, ... 139a. The phase shifter 123n includes elements for modeling phases $\theta_0$ to $\theta_k$ 127n, 133n, ... 139n. The phase shifter 123a also includes elements for modeling error terms $\sigma_{00}$ to $\sigma_{ik}$ 129a, 135a, ... 141a. The phase shifter 123n also includes elements for modeling error terms $\sigma_{00}$ to $\sigma_{ik}$ 129n, 135n, ... 141n. The phase shifter 123a also includes elements for modeling error term $\rho_{00}$ to $\rho_{ik}$ 131a, 137a, ... 143a. The phase shifter 123n also includes elements for modeling error term $\rho_{00}$ to $\rho_{ik}$ 131n, 137n, ... 143n. The phase shifter 123a includes an output 145a, and the phase shifter 123n includes an output 145n.

The element for modeling error term $\alpha_0$ 167a is connected to the output 145a of the phase shifter 123a and includes an output 169a. The element for modeling error term $\alpha_i$ 167n is connected to the output 145n of the phase shifter 123n and includes an output 169n. The element for modeling error term $\psi_0$ 171a is connected to the output 169a of the element for modeling error term $\alpha_0$ 167a and includes an output 173a. The element for modeling error term $\psi_i$ 171n is connected to the output 169n of the element for modeling error term $\alpha_i$ 167n and includes an output 173n.

The antenna 107a is connected to one of the outputs 173a of the phased array transmitter 105 associated with the phase shifter 123a. The antenna 107n is connected to one of the outputs 173n of the phased array transmitter 105 associated with the phase shifter 123n.

Figure 2:
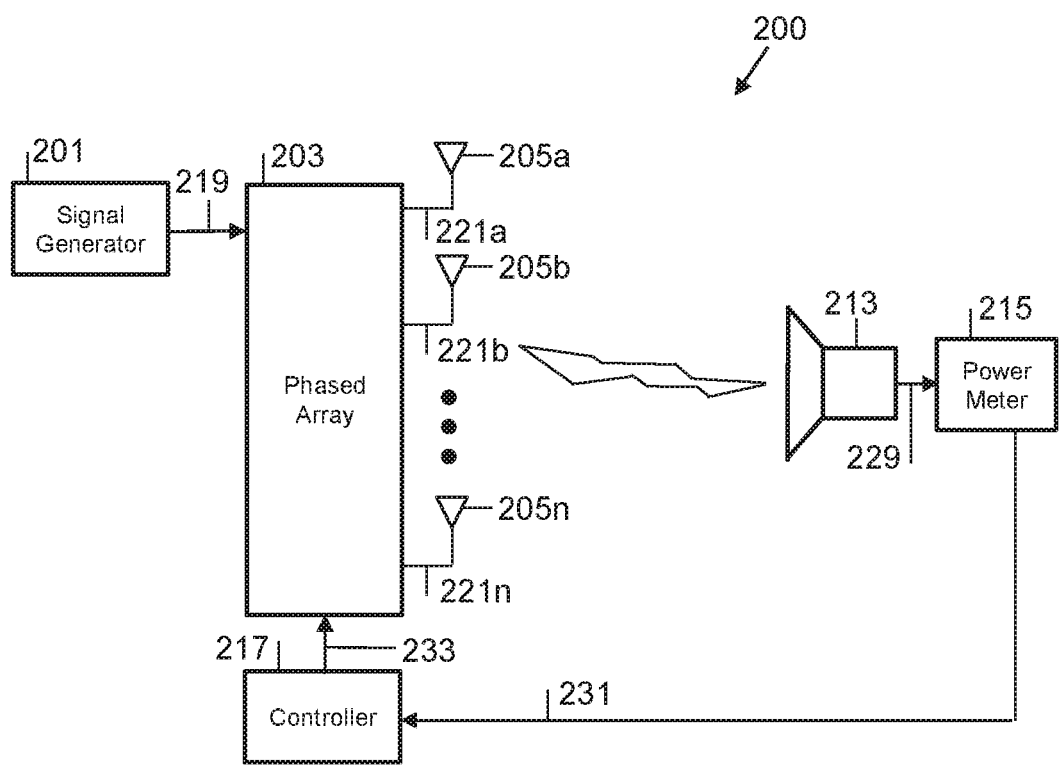
FIG. 2 illustrates an exemplary block diagram of an apparatus for calibrating an analog phased antenna array, according to an embodiment.

FIG. 2 illustrates an exemplary block diagram of an apparatus 200 for calibrating an analog phased antenna array, according to one embodiment.

Referring to FIG. 2, the apparatus 200 includes a signal generator 201, a phased array 203, and n antennas 205a, 205b, ..., and 205n, a measurement antenna 213, a power meter 215, and a controller 217.

The signal generator 201 includes an output 219 for providing a signal. The phased array 203 includes a first input connected to the output 219 of the signal generator 201, a second input for receiving a control signal from the controller 217, and n outputs 221a, 221b, ..., and 221n. The n antennas 205a, 205b, ..., and 205n are connected to the n outputs 221a, 221b, ... and 221n of the phased array 203, respectively. Each antenna 205a, 205b, ..., and 205n may transmit a signal. It is appreciated that any number of antennas may be used without deviating from the scope of the present disclosure.

The measurement antenna 213 receives a signal transmitted by any of the plurality of antennas 205a, 205b, ..., and 205n and includes an output 229. The power meter 215 includes an input connected to the output 229 of the measurement antenna 213, measures a power of a signal received by the measurement antenna 213, and includes an output 231 for outputting the measured power. The controller 217 includes an input connected to the output 231 of the power meter 215 for receiving a power measurement of a received signal and includes an output 233 connected to the second input of the phased array 203 for controlling the phased array 203 based on the power measurement.

For explicit calibration, the apparatus measures $\sqrt{P}\alpha_i\rho_{ik}$ and $\psi_i+\sigma_{ik}$ for all i and k, where all i and k are each positive integers greater than zero. Since $\theta_k$, which is a phase applied on an antenna, is known, $\psi_i+\theta_k+\sigma_{ik}$ may be measured instead of $\psi_i+\sigma_{ik}$, where $\psi_i$, $\sigma_{ik}$ are errors. $\psi_i+\theta_k+\sigma_{ik}$ may be represented by $\phi_{ik}$, where $\phi_{ik}$ refers to a total phase on the antenna after including the errors, and where i refers to an antenna number and k refers to a phase. An estimate of $\phi_{ik}$ may be indicated with a hat as $\hat{\phi}_{ik}$. A gain at antenna number i and at phase k may be defined as $g_{ik}=\sqrt{P}\alpha_i\rho_{ik}$, where $g_{ik}$ is measured. An estimate of $g_{ik}$ is indicated as $\hat{g}_k$. An absolute value of $\phi_{ik}$ cannot be measured using power measurements, since all power measurements remain invariant under a constant added to $\phi_{ik}$, hence the relative phase $\phi_{ik}-\phi_{00}$ for all $(i, k) \neq (0,0)$ is estimated.

Figure 3:
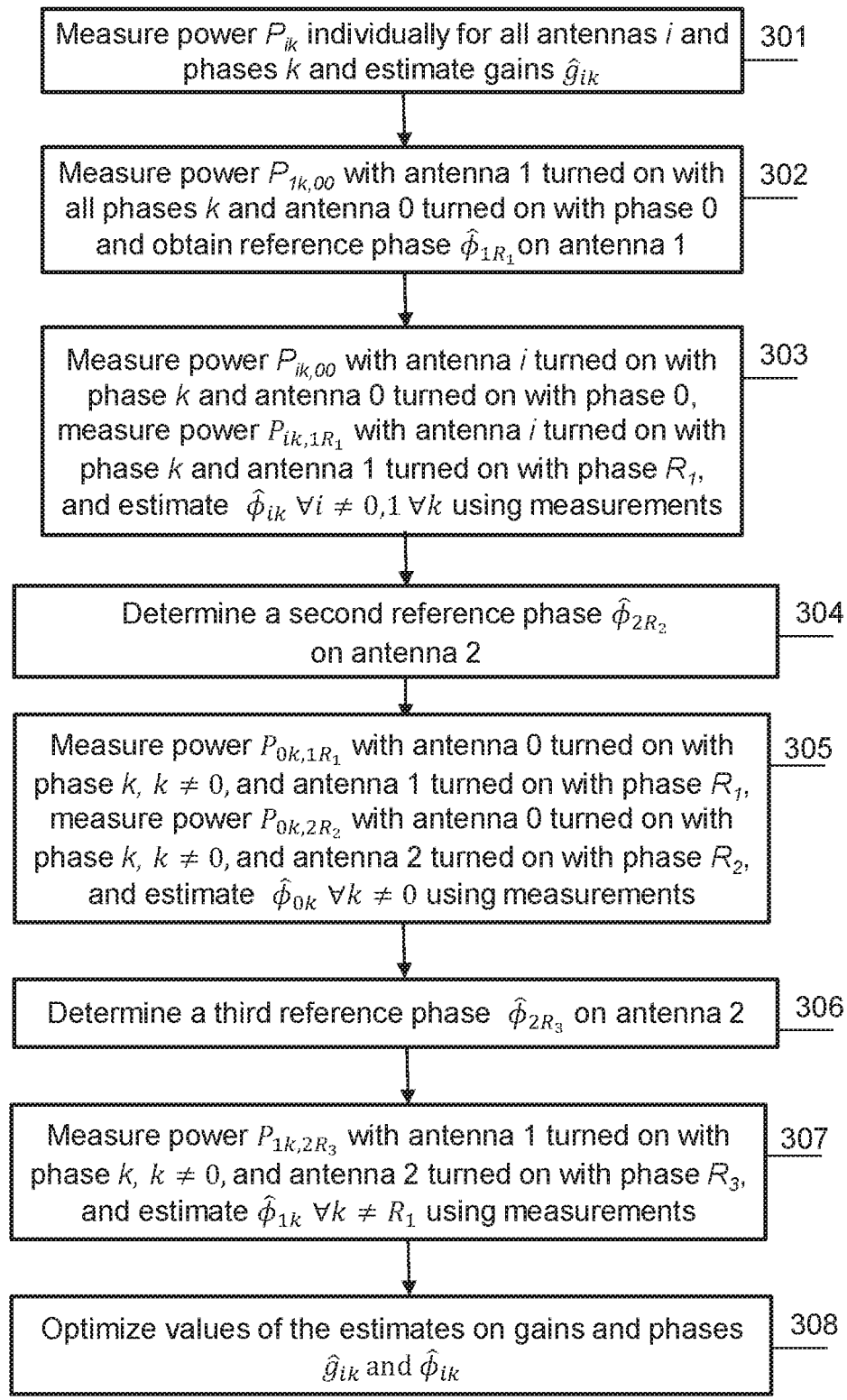
FIG. 3 illustrates an exemplary flowchart of a method of calibrating an analog phased antenna array, according to one embodiment.

FIG. 3 illustrates an exemplary flowchart of a method of calibrating an analog phased antenna array, according to one embodiment. For example, the method of FIG. 3 may be performed by the apparatus illustrated in FIG. 2.

Referring to FIG. 3, at 301, the apparatus measures power $P_{ik}$ for each antenna for all phases, where only one antenna is turned on at a time and gain $g_{ik}$ is estimated. The term $P_{ik}$ represents a power measured with an $i^{th}$ antenna turned on with phase k and all other antennas turned off, which provides an estimate for $g_{ik}=\sqrt{P_{ik}}$ for all (i, k). That is, gain errors $g_{ik}$ are estimated from power measurements as $\hat{g}_{ik}=\sqrt{P_{ik}}$.

The term $P_{i_1k_1,i_2k_2}$ is defined as a power measured with antennas $i_1$ and $i_2$ turned on with phases $k_1$ and $k_2$, respectively, with all other antennas turned off. Using power measurements $P_{i_1k_1,i_2k_2}$, a difference between phases at two antennas may be obtained. For example, with antenna number 0 (e.g., Ant0) on with phase $\phi_0$, antenna number i (e.g., Anti) on with phase $\theta_k$ and the other antennas turned off, received power is $$P_{ik,00} = |g_{00}e^{1j\cdot(\phi_{00})} + g_{ik}e^{1j\cdot(\phi_{ik})}|^2 = g_{00}^2 + g_{ik}^2 + 2g_{ik}g_{00}\cos(\phi_{ik}-\phi_{00}).$$

Since $g_{ik}$ has already been estimated, this measurement may yield an estimate for $$\cos(\phi_{ik}-\phi_{00}) \text{ as } \frac{P_{ik,00}-P_{ik}-P_{00}}{2\sqrt{P_{ik}P_{00}}}.$$

Since the present method estimates a relative phase $\phi_{ik}-\phi_{00}$, $\hat{\phi}_{00}$ may be set to 0 to obtain an estimate of $\phi_{ik}$ (i.e., $\hat{\phi}_{ik}$).

Figure 4:
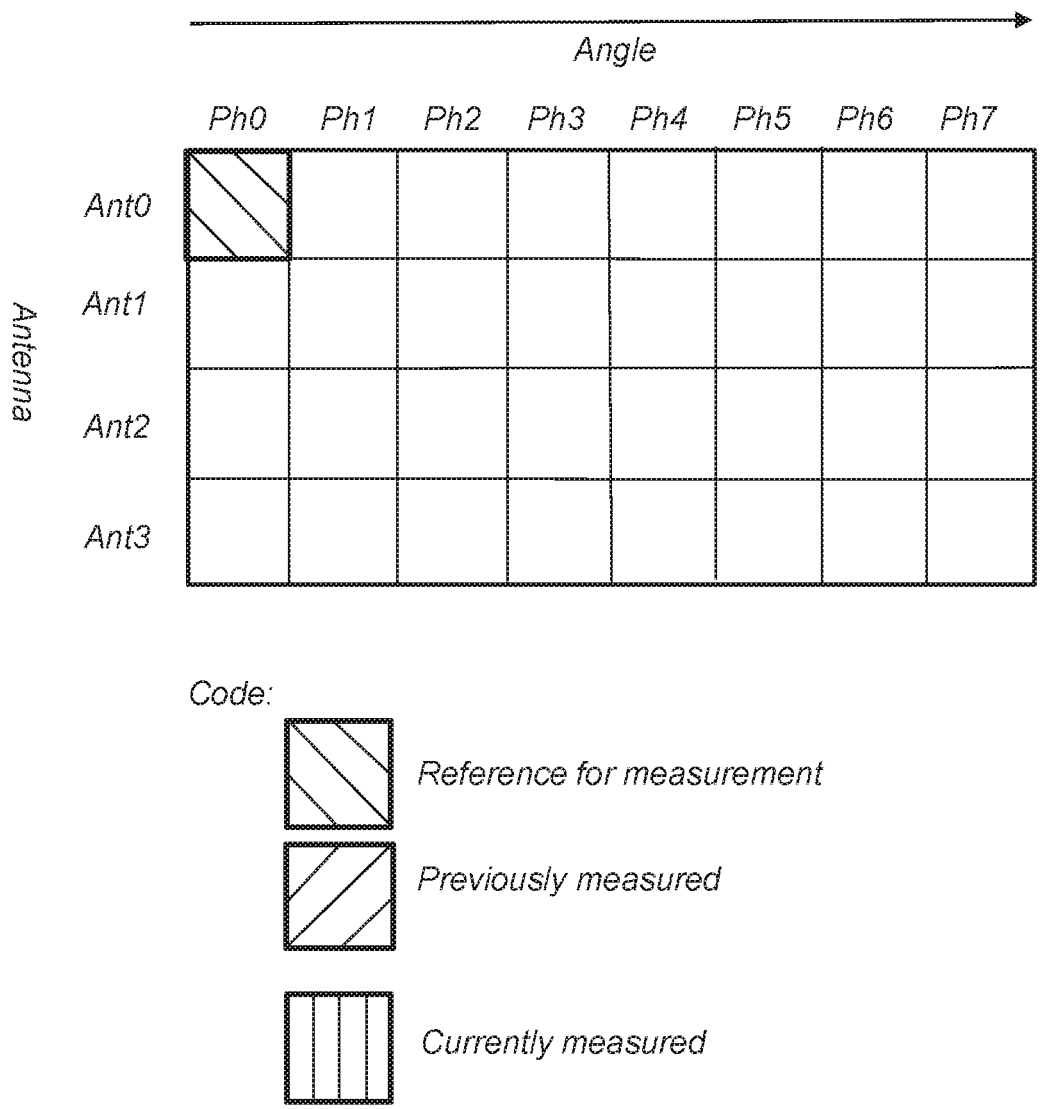
FIG. 4 illustrates an exemplary diagram of antennas and phases with one reference measurement, according to one embodiment.

FIG. 4 illustrates an exemplary diagram of antennas and phases with one reference measurement, according to one embodiment. Although the following descriptions are provided with reference to four antennas (e.g., N=4), and three bits for representing phases (e.g., Q=3, equivalently $2^Q=2^3=8$ phases), the present apparatus and method may be applied to any number of antennas and phases with $N\geq 3$, $Q\geq 2$.

From $\cos(\phi_{ik})$, the phases cannot be determined uniquely. Hence, at least two measurements with respect to two reference phases are required for uniquely determining the phases.

Figure 5:
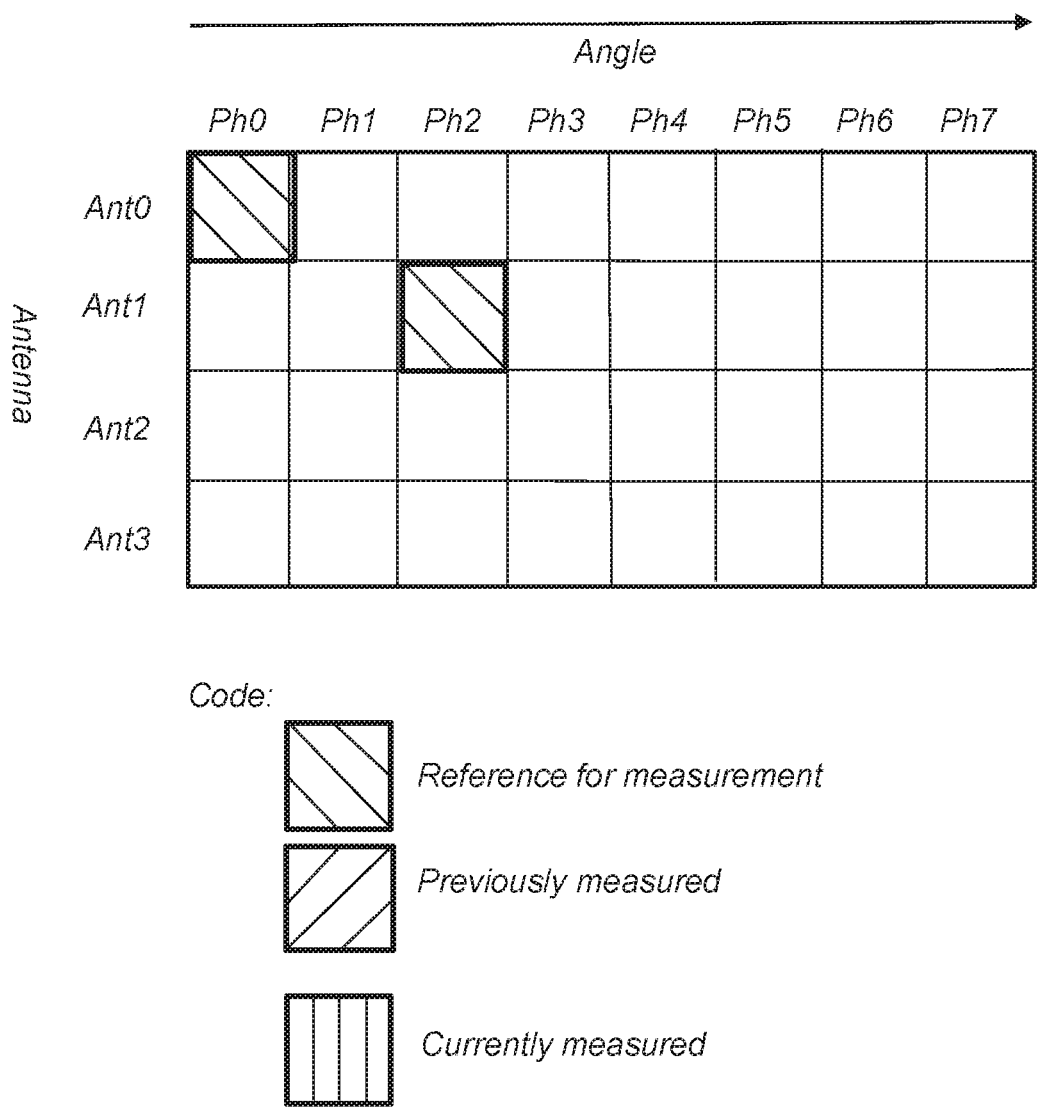
FIG. 5 illustrates an exemplary diagram of antennas and phases with two reference phase measurements, according to one embodiment.

FIG. 5 illustrates an exemplary diagram of antennas and phases with two reference phase measurements, according to one embodiment. A first reference may be referred to as $\hat{\phi}_{00}$ and a second reference may be selected as $\hat{\phi}_{1R_1}$ where $\hat{\phi}_{1R_1}$ is to be determined.

Referring again to FIG. 3, at 302, the present apparatus determines the reference phase $\hat{\phi}_{1R_1}$. According to one embodiment, the present apparatus selects $R_1$ such that $|\hat{\phi}_{1R_1}|$ is close to $$\frac{\pi}{2}.$$

The present apparatus performs measurements $P_{1k,00}$, obtains $$\cos\phi'_{1k} = \frac{P_{1k,00}-P_{1k}-P_{00}}{2\sqrt{P_{1k}P_{00}}},$$

and selects $R_1$ as $$R_1 = \arg\min_k |\cos\phi'_{1k}|.$$

Figure 6:
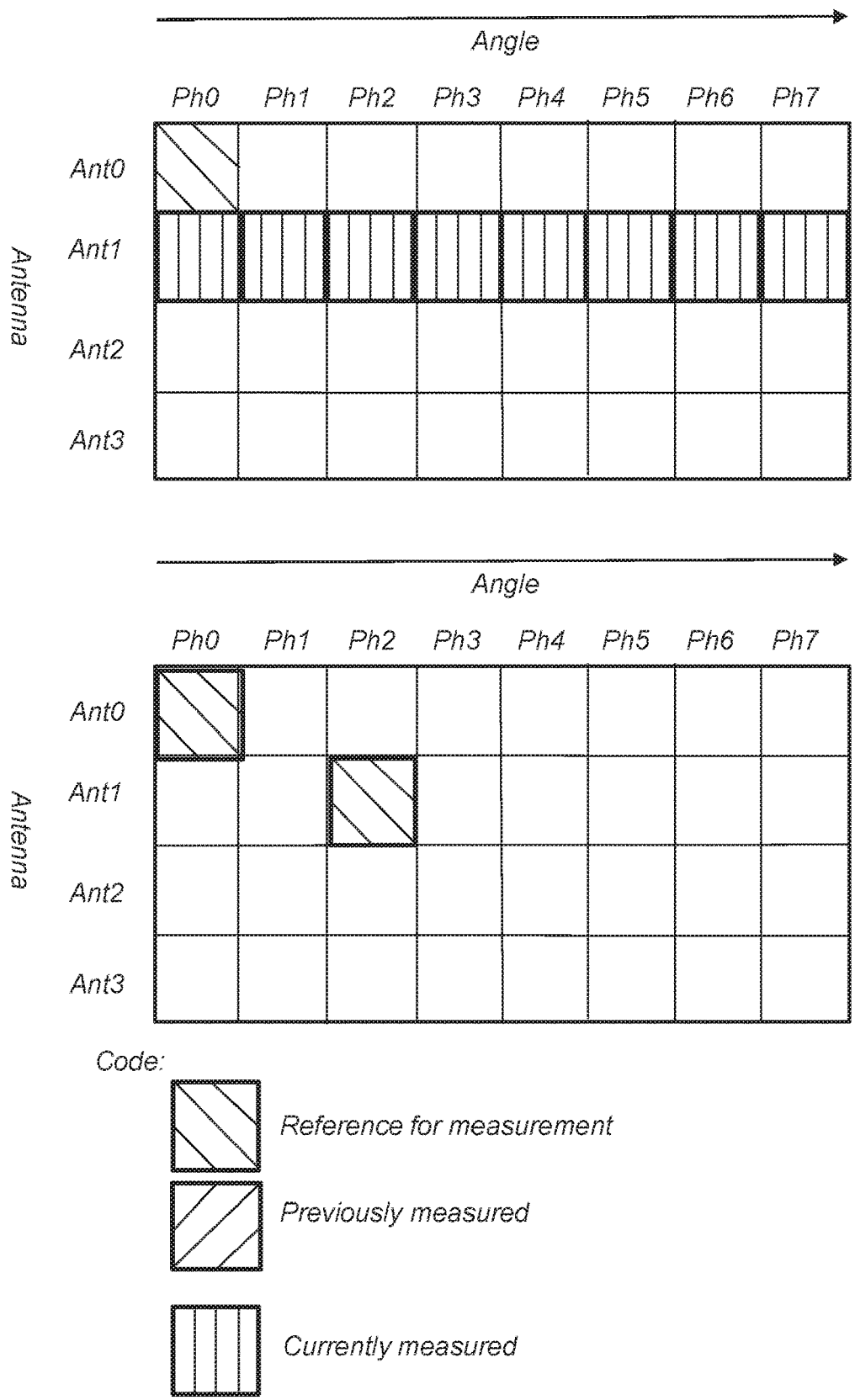
FIG. 6 illustrates an exemplary diagram of antennas and phases, where a second estimated reference phase is selected, according to one embodiment.

FIG. 6 illustrates an exemplary diagram of antennas and phases where a second reference phase $\hat{\phi}_{1R_1}$ is selected, according to one embodiment.

To resolve the sign of $\hat{\phi}_{1R_1}$, the present apparatus may check the value of cos( ) measurements on the phase that is ahead of $\phi'_{1R_1}$ by $2^{Q-2}$ indices. If $\phi'_{1R_1}$ was close to $$\frac{-\pi}{2},$$

then shifting the phase value forward by $2^{Q-2}$ indices from $R_1$ will cause the new phase to be close to zero, since the phase quantization has separation $$\frac{\pi}{2^{Q-1}}.$$

Thus $\phi'_{1(R_1+2^{Q-2})\mod(2^Q)}$ will be close to 0, i.e., cos $(\phi'_{1(R_1+2^{Q-2})\mod(2^Q)})$ will be close to +1. If $\phi'_{1R_1}$ is close to $$\frac{+\pi}{2},$$

then shifting the phase value forward by $2^{Q-2}$ indices from $R_1$ will cause the new phase to be close to $\pi$, i.e., $\phi'_{1(R_12^{Q-2})mod(2^Q)}$ will be close to $\pi$ and $\cos(\phi'_{1(R_12^{Q-2})mod(2^Q)})$ will be close to $-1$. Hence $\hat{\phi}_{1R_1}=\cos^{-1}(\cos\phi'_{1R_1})$ if $|\cos(\phi'_{1(R_1+2^{Q-2})mod(2^Q)})+1|\leq|\cos(\phi'_{1(R_1+2^{Q-2})mod(2^Q)})-1|$ and $\hat{\phi}_{1R_1}=-\cos^{-1}(\cos\phi'_{1R_1})$ if $|\cos(\phi'_{1(R_1+2^{Q-2})mod(2^Q)})-1|<|\cos(\phi'_{1(R_1+2^{Q-2})mod(2^Q)})+1|$.

Figure 7:
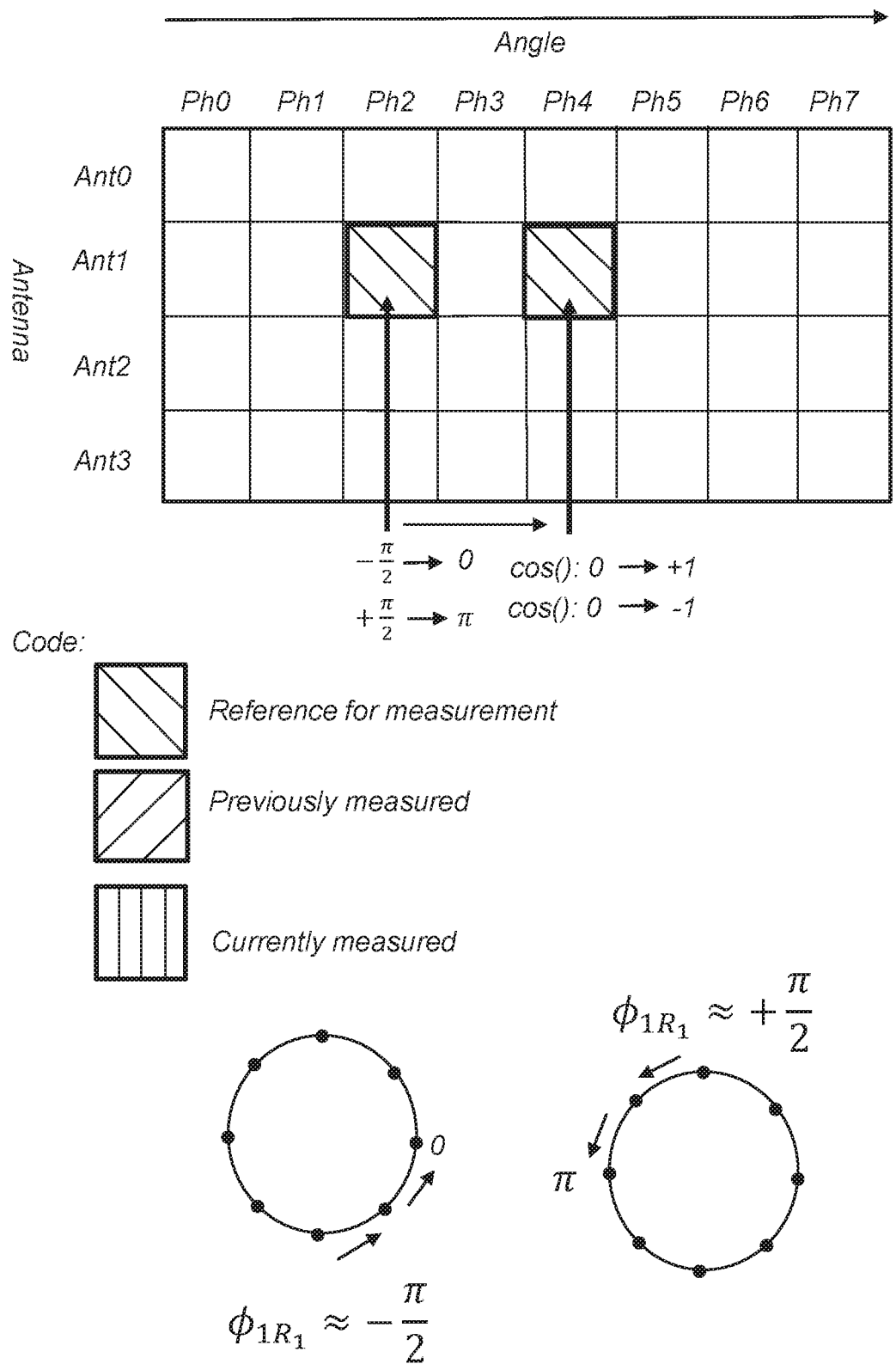
FIG. 7 illustrates an exemplary diagram of antennas and phases, where a sign of an estimated reference phase is resolved, according to one embodiment.

FIG. 7 illustrates an exemplary diagram of antennas and phases where the sign of $\hat{\phi}_{1R_1}$ is resolved, according to one embodiment. For Q=3, the sign of $\hat{\phi}_{1R_1}$ may be resolved by looking at the value of $\cos(\phi'_{1(R_1+2)mod8})$.

Thus, if $\cos(\phi'_{1(R_1+2^{Q-2})mod(2^Q)})$ is close to $+1$, then $\hat{\phi}_{1R_1}$ may be selected as close to $$\frac{-\pi}{2}.$$

If $\cos(\phi'_{1(R_1+2^{Q-2})mod(2^Q)})$ is close to $-1$, $\hat{\phi}_{1R_1}$ may be selected as close to $$\frac{\pi}{2},$$

using the estimate for $\cos\phi'_{1R_1}$.

Referring again to FIG. 3, at 303, the present apparatus measures all phases of Anti i≠0,1 with reference to $\phi_{00}$ and $\phi_{1R_1}$. The power measurements $P_{ik,00}$ and $P_{ik,1R_1}$ are obtained for i≠0,1. Then, the estimates for $\cos(\phi_{ik})$, $\cos(\phi_{ik}-\phi_{1R_1})$ are obtained as $$\frac{P_{ik,00}-P_{ik}-P_{00}}{2\sqrt{P_{ik}P_{00}}}, \frac{P_{ik,1R_1}-P_{ik}-P_{1R_1}}{2\sqrt{P_{ik}P_{1R_1}}},$$

respectively.

Figure 8:
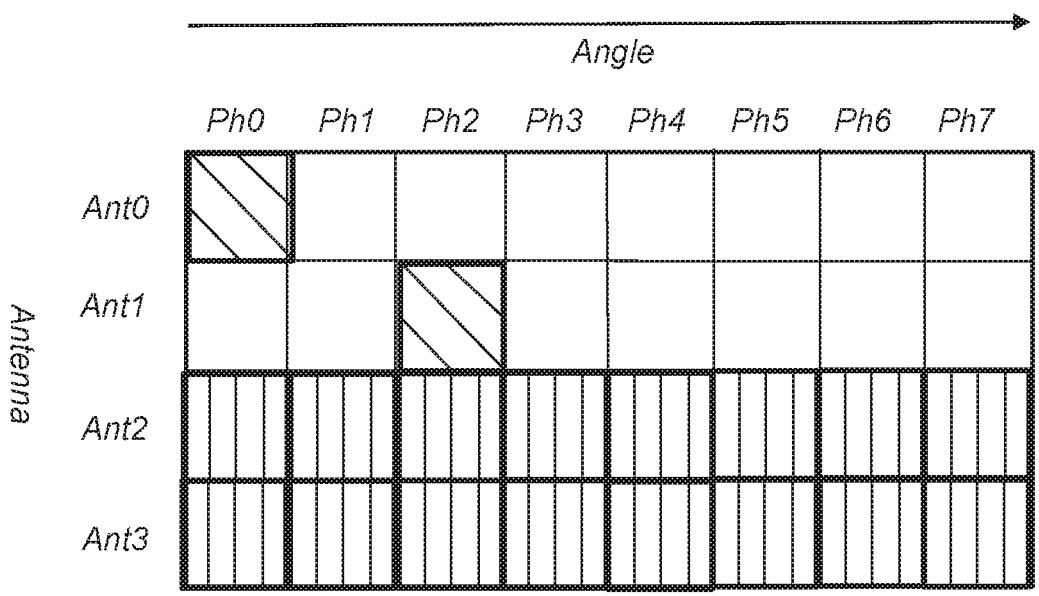
FIG. 8 illustrates an exemplary diagram of antennas and phases, where phases of multiple antennas are measured with reference to estimated reference phases, according to one embodiment.
Figure 8:
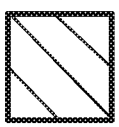
Figure 8:
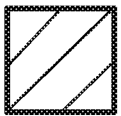
Figure 8:
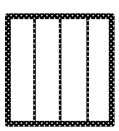

FIG. 8 illustrates an exemplary diagram of antennas and phases, where phases of multiple antennas are measured with reference to $\phi_{00}$ and $\phi_{1R_1}$, according to one embodiment.

An estimate for $\phi_{ik}$ may be obtained as follows in Equations (2), (3), (4), and (5):

$$A = \frac{P_{ik00}-P_{ik}-P_{00}}{2\sqrt{P_{ik}P_{00}}} \quad (2)$$

$$B = \frac{P_{ik,1R_1}-P_{ik}-P_{1R_1}}{2\sqrt{P_{ik}P_{1R_1}}} \quad (3)$$

$$\begin{bmatrix} u \\ v \end{bmatrix} = \begin{bmatrix} 1 & 0 \\ \cos\hat{\phi}_{1R_1} & \sin\hat{\phi}_{1R_1} \end{bmatrix}^{-1} \begin{bmatrix} A \\ B \end{bmatrix} \quad (4)$$

$$\hat{\phi}_{ik} = \text{Angle}(u+1j\cdot v) \quad (5)$$

Referring again to FIG. 3, at 304, the present apparatus determines a second reference phase $\hat{\phi}_{2R_2}$. All of the phases on Anti, where i≠0,1, have been measured. Only one phase $\hat{\phi}_{00}=0$ is estimated for Ant0. For measuring the rest of the phases for Ant0, at least two references are required. One of the references may be set as $\phi_{1R_1}$. The other reference phase from antenna number 2 (e.g., Ant2) may be selected as $\phi_{2R_2}$. Similar to how $\phi_{1R_1}$ was selected in relation to $\phi_{00}$, requiring the two references to be approximately $$\frac{\pi}{2}$$

apart, me present apparatus selects $\phi_{2R_2}$ in relation to $\phi_{1R_1}$. The reference $\phi_{2R_2}$ is chosen from the phases of Ant2 such that $|\cos(\phi_{2R_2}-\phi_{1R_1})|$ is closest to zero. This is performed by using the estimated values of the phases of Ant2 as in Equation (5a) as follows:

$$R_2 = \underset{k}{\text{argmin}}\left|\cos(\hat{\phi}_{2k}-\hat{\phi}_{1R_1})\right| \quad (5a)$$

At 305, the present apparatus measures all remaining phases of Ant0 with reference to $\hat{\phi}_{1R_1}$, $\hat{\phi}_{2R_2}$. The phase $\hat{\phi}_{00}$ was initially set as zero for reference, the remaining phases of Ant0 is estimated from power measurements $P_{0k,1R_1}$, $P_{0k,2R_2}$ as follows in Equations (6), (7), (8), and (9):

$$A = \frac{P_{0k,R_1}-P_{0k}-P_{1R_1}}{2\sqrt{P_{0k}P_{1R_1}}} \quad (6)$$

$$B = \frac{P_{0k,2R_2}-P_{0k}-P_{2R_2}}{2\sqrt{P_{0k}P_{2R_2}}} \quad (7)$$

$$\begin{bmatrix} u \\ v \end{bmatrix} = \begin{bmatrix} \cos\hat{\phi}_{1R_1} & \sin\hat{\phi}_{1R_1} \\ \cos\hat{\phi}_{2R_2} & \sin\hat{\phi}_{2R_2} \end{bmatrix}^{-1} \begin{bmatrix} A \\ B \end{bmatrix} \quad (8)$$

$$\hat{\phi}_{0k} = \text{Angle}(u+1j\cdot v) \quad (9)$$

Figure 9:
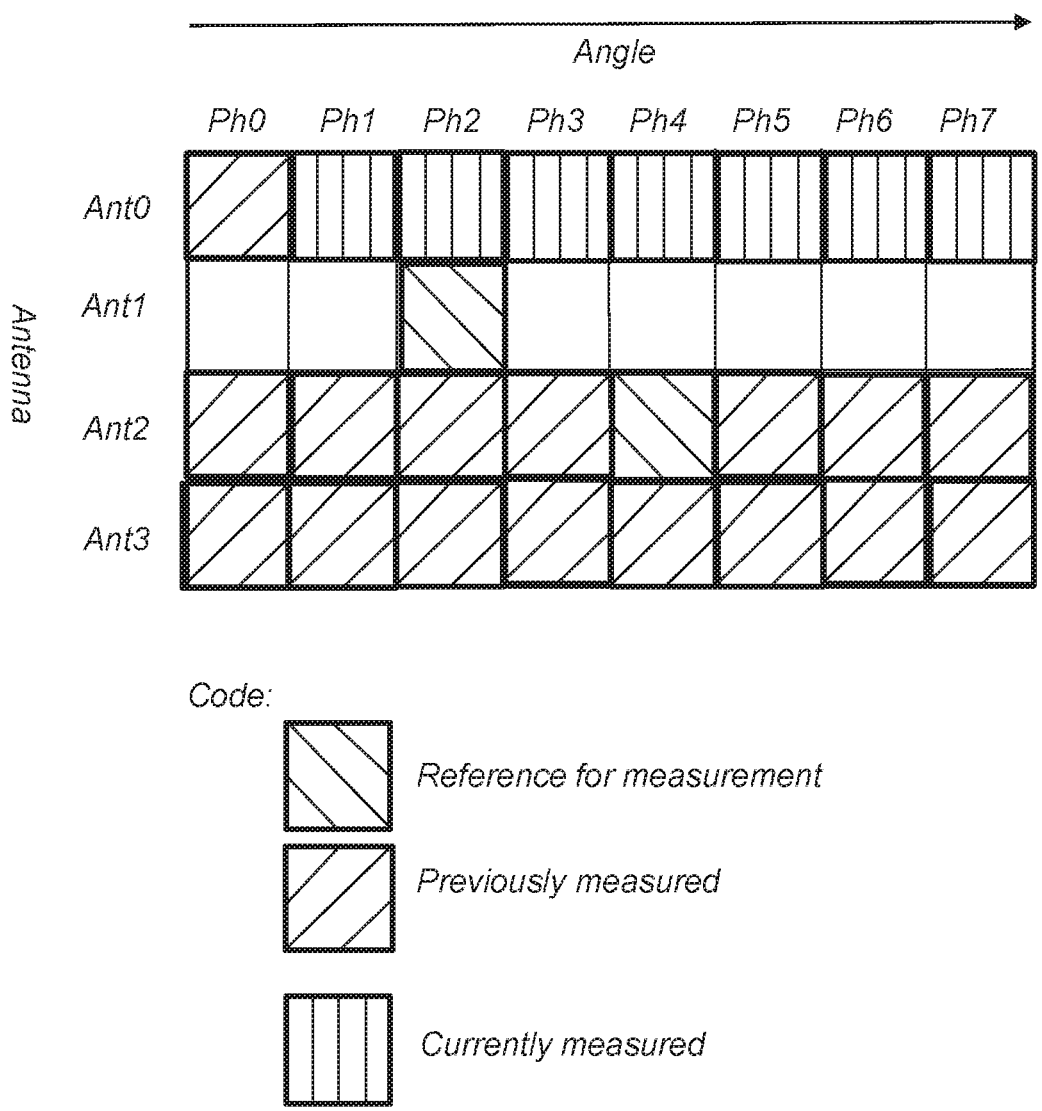
FIG. 9 illustrates an exemplary diagram of antennas and phases, where phases of an antenna are measured with reference to estimated reference phases, according to one embodiment.

FIG. 9 illustrates an exemplary diagram of antennas and phases, where phases of Ant0 are measured with reference to $\hat{\phi}_{1R_1}$ and $\hat{\phi}_{2R_2}$, according to one embodiment. The process of measuring phases of Ant0 with reference to $\hat{\phi}_{1R_1}$ and $\hat{\phi}_{2R_2}$ is similar to the description of 303 above.

Referring again to FIG. 3, at 306, the present apparatus determines $\hat{\phi}_{2R_3}$. The remaining phases to be measured are of Ant1, and it requires at least two references. The first reference may be selected as $\hat{\phi}_{00}$ and the second reference may be selected as $\hat{\phi}_{2R_3}$. The present apparatus may select the reference phase $\hat{\phi}_{2R_3}$ approximately $$\frac{\pi}{2}$$

away from $\phi_{00}$, to ensure that $|\cos(\hat{\phi}_{2R_3}-\hat{\phi}_{00})|=|\cos(\hat{\phi}_{2R_3})|$ is closest to zero. The present apparatus determines the reference phase $\hat{\phi}_{2R_3}$ by using the estimated values of the phases of Ant2 as follows in Equation (10):

$$R_3 = \underset{k}{\text{argmin}}\left|\cos(\hat{\phi}_{2k})\right| \quad (10)$$

At 307, the present apparatus measures all remaining phases of Ant1 with reference to $\hat{\phi}_{00}$, $\hat{\phi}_{2R_3}$. The remaining phases of Ant1 are estimated from the measurements $P_{1k,00}$, $P_{1k,2R_3}$. The estimate of the $k^{th}$ phase on Ant1, $\hat{\phi}_{1k}$ is obtained from power measurements as follows in Equations (11), (12), (13), and (14):

$$A = \frac{P_{1k,00} - P_{1k} - P_{00}}{2\sqrt{P_{1k}P_{00}}} \quad (11)$$

$$B = \frac{P_{1k,2R_3} - P_{1k} - P_{2R_3}}{2\sqrt{P_{1k}P_{2R_3}}} \quad (12)$$

$$\begin{bmatrix} u \\ v \end{bmatrix} = \begin{bmatrix} 1 & 0 \\ \cos\hat{\phi}_{2R_3} & \sin\hat{\phi}_{2R_3} \end{bmatrix}^{-1} \begin{bmatrix} A \\ B \end{bmatrix} \quad (13)$$

$$\hat{\phi}_{1k} = \text{Angle}(u + 1j \cdot v) \quad (14)$$

Figure 10:
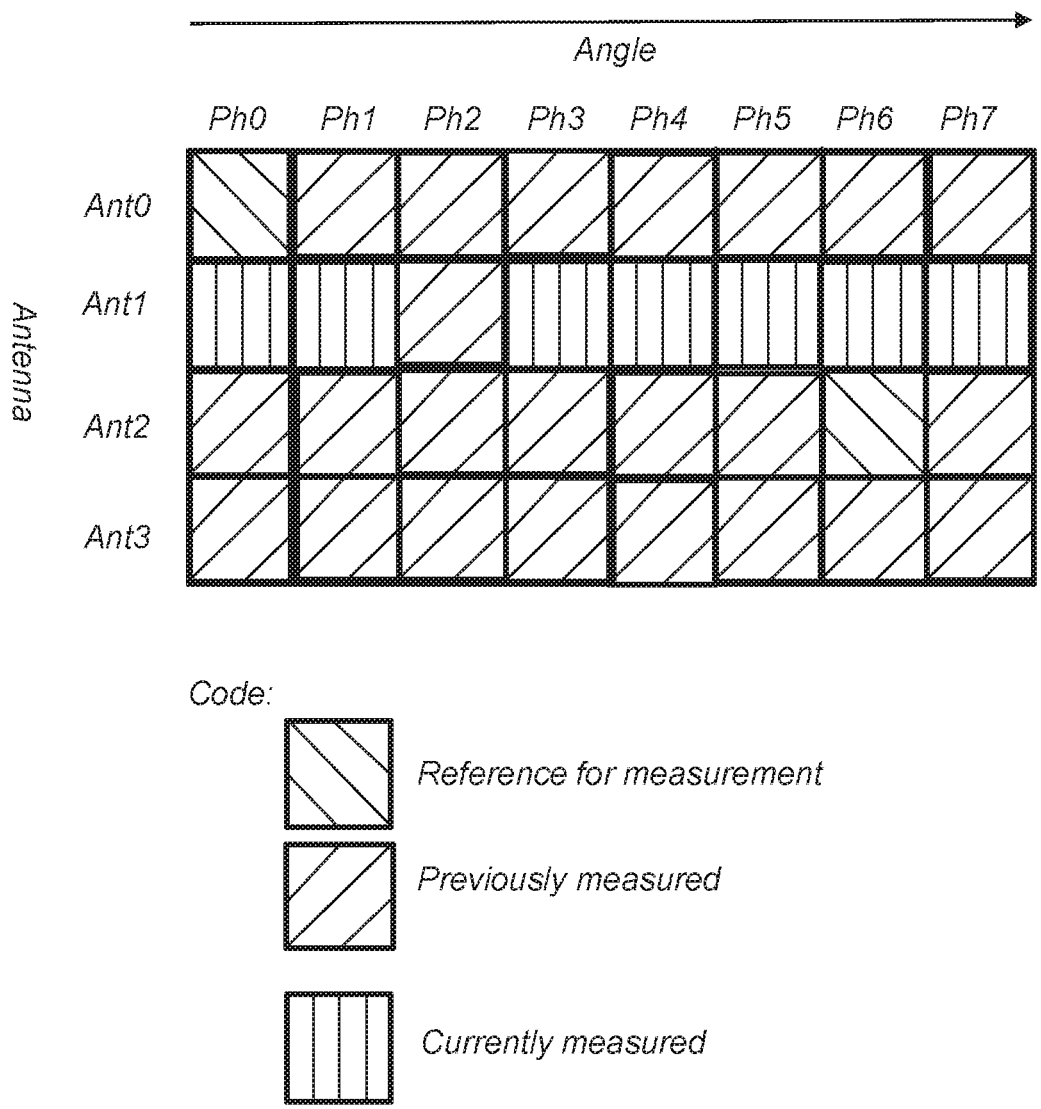
FIG. 10 illustrates an exemplary diagram of antennas and phases, where phases of an antenna are measured with reference to two estimated phases, according to one embodiment.

FIG. 10 illustrates an exemplary diagram of antennas and phases, where phases of Ant1 are measured with reference to $\hat{\phi}_{00}$ and $\hat{\phi}_{2R_3}$, according to one embodiment. $P_{1k,00}$ has already been measured while $\hat{\phi}_{1R_1}$ was being chosen at 302, thus the current measurements required are $P_{1k,2R_3}$. $\hat{\phi}_{1k}$ is obtained from $P_{1k,00}$, $P_{1k,2R_3}$ using similar calculations as at 305 in FIG. 3.

Referring again to FIG. 3, at 308, the present apparatus optimizes the values of $\hat{g}_{ik}$ and $\hat{\phi}_{ik}$. In one embodiment, the present apparatus performs a least squared optimization to minimize an error in the estimates due to noise in the measurements. The variables may be changed to $$\hat{g}_{ik}e^{1j(\hat{\phi}_{ik})} = g'_{rik} + 1j \cdot g'_{cik}$$

for performing an optimization as follows in Equations (15) and (16):

$$\{g^{*'}_{Rik}, g^{*'}_{Cik}\} = \underset{\{g'_{Rik}, g'_{Cik}\}}{\text{Minimize}} f(\{g'_{Rik}, g'_{Cik}\}) \quad (15)$$

$$f(\{g'_{Rik}, g'_{Cik}\}) = \sum_{k=0}^{2^Q-1} \sum_{i=0}^{N-1} (|g'_{rik} + 1j \cdot g'_{cik}|^2 - P_{ik})^2 + \quad (16)$$

$$\sum_{k=0}^{2^Q-1} \sum_{i=2}^{N-1} ((|g'_{rik} + 1j \cdot g'_{cik} + g'_{r00} + 1j \cdot g'_{c00}|^2 - P_{ik,00})^2 +$$

$$(|g'_{rik} + 1j + g'_{cik} + g'_{r1R_1} + 1j \cdot g'_{c1R_1}|^2 - P_{ik,1R_1})) +$$

$$\sum_{k=1}^{2^Q-1} ((|g'_{r0k} + 1j \cdot g'_{c0k} + g'_{r1R_1} + 1j \cdot g'_{c1R_1}|^2 - P_{0k,1R_1})^2 +$$

$$(|g'_{r0k} + 1j \cdot g'_{c0k} + g'_{r2R_2} + 1j \cdot g'_{c2R_2}|^2 - P_{0k,2R_2})^2) +$$

$$\sum_{k \neq R_1, k=0}^{2^Q-1} ((|g'_{r1k} + 1j \cdot g'_{c1k} + g'_{r00} + 1j \cdot g'_{c00}|^2 - P_{1k,00})^2 +$$

$$(|g'_{r1k} + 1j \cdot g'_{c1k} + g'_{r2R_3} + 1j \cdot g'_{c2R_3}|^2 - P_{1k,2R_3})^2)$$

The starting point for the optimization is taken from the solution obtained from the previous steps. The optimal value is used to obtain new estimates on $g_{ik}$ and $\phi_{ik}$ as follows in Equation (17):

$$\hat{g}^*_{ik} e^{1j(\hat{\phi}^*_{ik})} = g^{*'}_{rik} + 1j \cdot g^{*'}_{cik} \quad (17)$$

According to one embodiment, the optimization problem at 308 may be performed with a different metric. For example, the form $(|g'_{rik}+1j\cdot g'_{cik}+g'_{r00}+1j\cdot g'_{c00}|^2-P_{ik,00})^2$ may be replaced with $||g'_{rik}+1j\cdot g'_{cik}+g'_{r00}+1j\cdot g'_{c00}|^2-P_{ik,00}|$, $||g'_{rik}+1j\cdot g'_{cik}+g'_{r00}+1j\cdot g'_{c00}|-\sqrt{P_{ik,00}}|$ or $||g'_{rik}+1j\cdot g'_{cik}+g'_{r00}+1j\cdot g'_{c00}|-\sqrt{P_{ik,00}}|^2$. This could be any valid distance metric in general.

According to one embodiment, the reference phase $\hat{\phi}_{00}$ is set as zero and three other reference phases $\hat{\phi}_{1R_1}, \hat{\phi}_{2R_2}, \hat{\phi}_{2R_3}$ are selected. According to another embodiment, the reference phase is set to be another phase from another antenna to be kept as zero and three other references are chosen from other different antennas. For example, the present apparatus may set $\hat{\phi}_{36}=0$ and the three other references may be selected as $\hat{\phi}_{0R_1}, \hat{\phi}_{1R_2}, \hat{\phi}_{1R_3}$.

After estimating the errors, the present apparatus may use the errors to modify a codebook according to the estimated phase values. When the codebook is designed with codewords to maximize power in a given set of directions $\{\Phi_1, \ldots, \Phi_L\}$, the present apparatus may obtain new codewords that maximize power in the directions $\{\Phi_1, \ldots, \Phi_L\}$, in the presence of errors. Shifting the phases on the antennas by adding a constant to all of the phases, does not affect a beam pattern. The shift to the ideal codeword may be made so that the required phase on the first antenna for the codeword matches the estimated value $\hat{\phi}_{0k_0}$ for some $k_0$.

For example, the present apparatus obtains candidate codes after shifting the ideal codeword. Considering an initial (e.g., ideal) codeword $[\phi_{0k_0}, \phi_{1k_1}, \phi_{2k_2}, \phi_{3k_3}]$ for some particular steering direction, the present apparatus may shift the codeword to match $\hat{\phi}_{03}$ in the first position of codeword, where the shifted codeword is then $[\hat{\phi}_{03}, \phi_{1k_1}+\hat{\phi}_{03}-\phi_{0k_0}, \phi_{2k_2}+\hat{\phi}_{03}-\phi_{0k_0}, \phi_{3k_3}+\hat{\phi}_{03}-\phi_{0k_0}]$. For the other antennas, the phases may not be matched exactly with estimated phase values $\hat{\phi}_{ik}$, so there are two closest values for $\hat{\phi}_{ik}$ compared to the shifted value $\phi_{ik}+\hat{\phi}_{03}-\phi_{0k_0}$. Thus, the total possible codewords are $2^Q*2^{N-1}$, since there are $2^Q$ possibilities for phases on the first antenna and 2 possibilities for phases on each of the remaining N-1 antennas.

Figure 11:
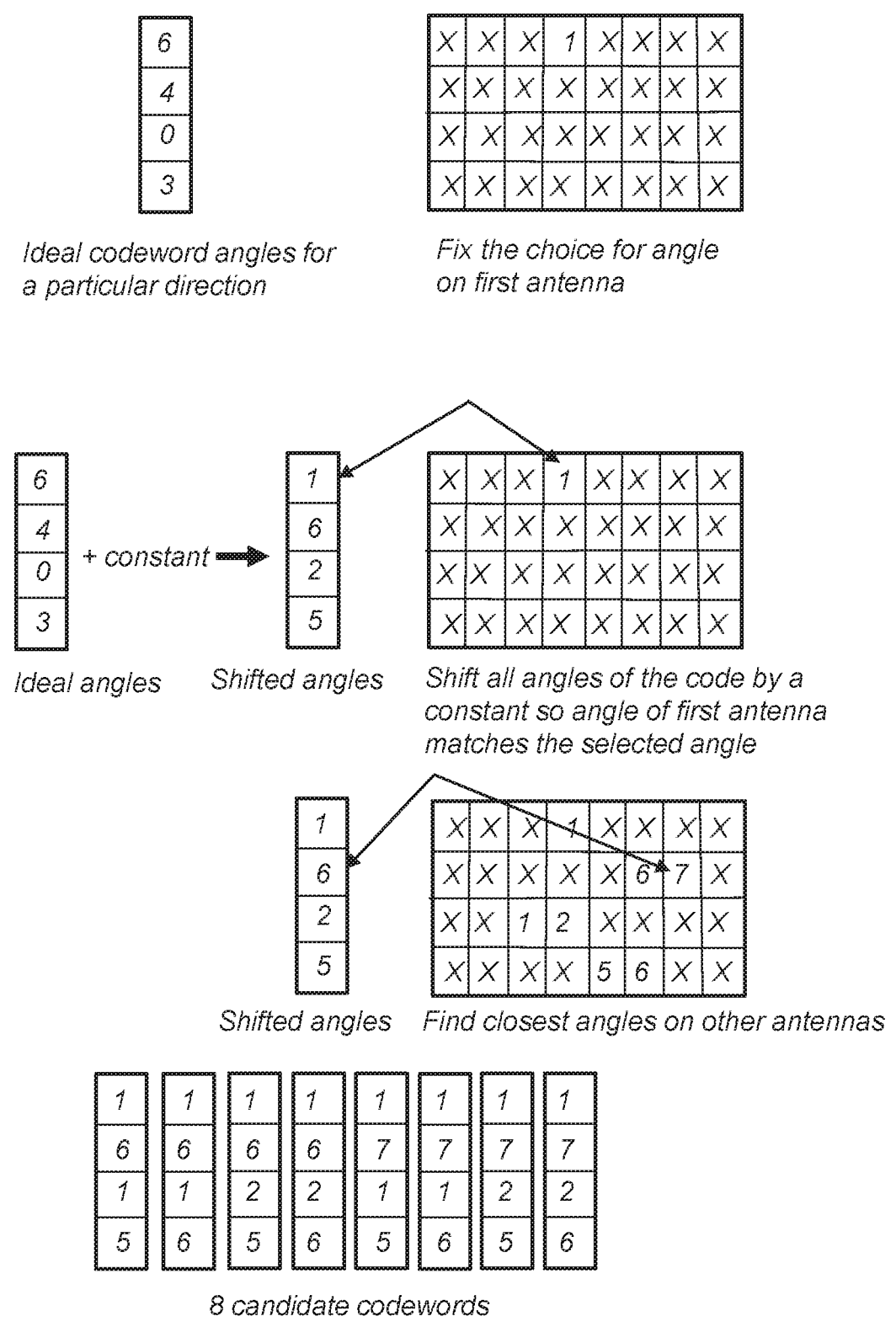

FIG. 11 illustrates an exemplary diagram of selecting candidate codewords for a certain direction, according to one embodiment. In one embodiment, a steering direction may have a fixed choice for a first antenna.

Referring to FIG. 11, the present apparatus selects the candidate codewords for a particular direction for Q=3, N=4. This may be repeated by going through all phases for the first antenna.

From the candidate codewords for a given steering direction, the present apparatus may select the codeword that provides the maximum power in that steering direction. This may be carried out for all steering directions.

Figure 12:
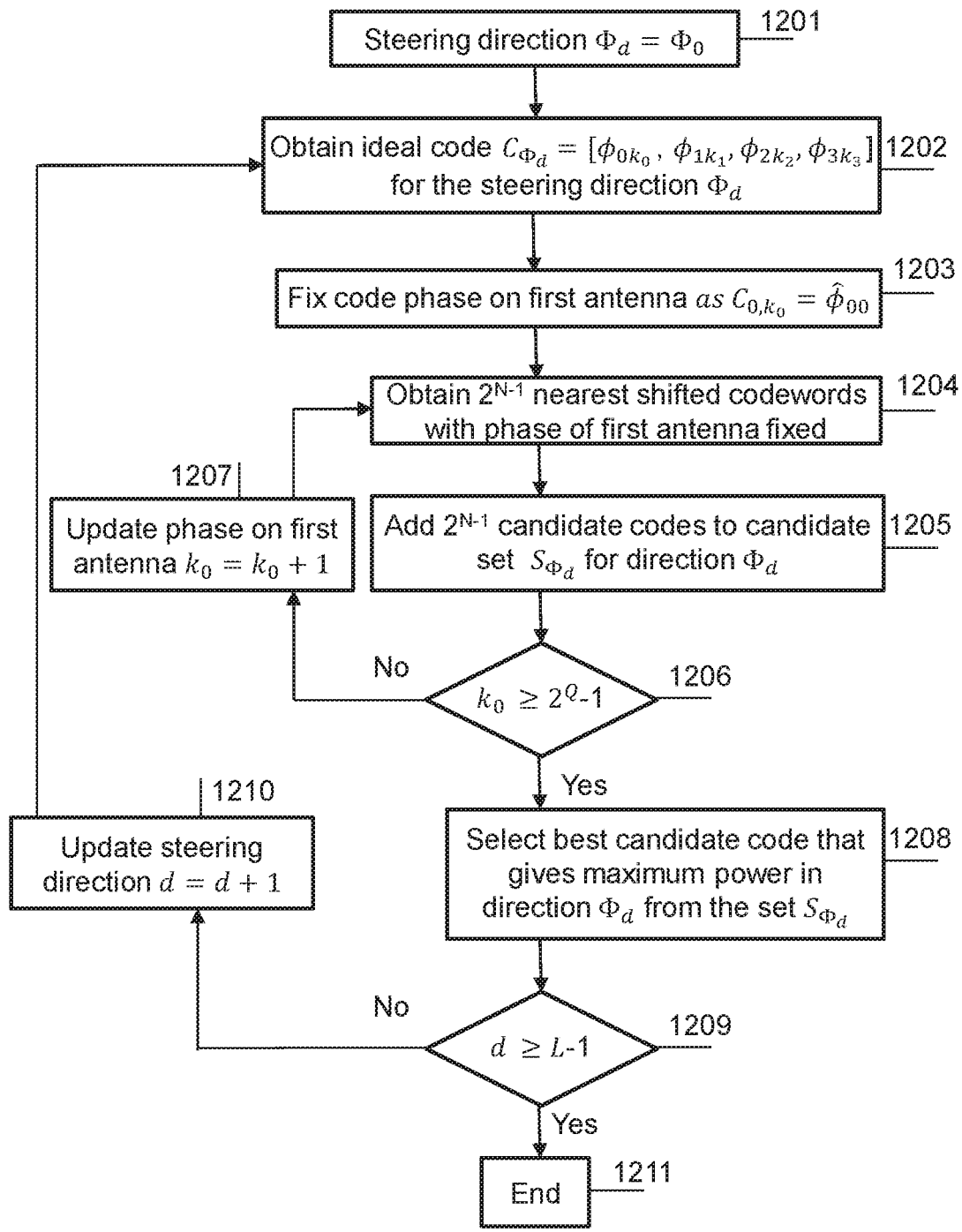
FIG. 12 is a flowchart of a method of obtaining updated codewords after analog phased antenna array calibration, according to one embodiment.

FIG. 12 illustrates an exemplary diagram of a flowchart of a method for obtaining updated codewords after antenna array calibration, according to one embodiment.

Referring to FIG. 12, at 1201, the present apparatus sets a steering direction $\Phi_d=\Phi_0$.

At 1202, the present apparatus obtains ideal code $C_{\Phi_d}=[\phi_{0k_0}, \phi_{1k_1}, \phi_{2k_2}, \phi_{3k_3}]$ for the steering direction $\Phi_d$.

At 1203, the present apparatus sets a code phase on the first antenna as $C_{0,k_0}=\phi_{00}$.

At 1204, the present apparatus obtains $2^{N-1}$ nearest shifted codewords with the phase of the first antenna that was set, where N is the number of antennas, where $C_{\Phi_d, candidates}=[c_{0,k_0}, c_{1,k_1}, c_{2,k_2}, \ldots], c_{m,k_m} \in \{c_{m1,k_m}, c_{m2,k_m}\}, m \in [1, N-1]$, and where $c_{m1,k_m}$ and $c_{m2,k_m}$ are two angles closest to $\phi_{mk_1}+c_{0,k_0}-\phi_{0k_0}$ from the set of estimated phases.

At 1205, the present apparatus adds $2^{N-1}$ candidate codes to a candidate set $S_{\Phi_d}$ for direction $\Phi_d$.

At 1206, the present apparatus determines if $k_0 \geq 2^Q-1$, where Q is a number of bits in a phase shifter.

If at 1206 the present apparatus determines that $k_0 < 2^Q-1$, then the present method proceeds to 1207. If at 1206 the present apparatus determines that $k_0 \geq 2^Q-1$, then the present method proceeds to 1208.

At 1207, the present apparatus updates the phase on the first antenna to $k_0=k_0+1$ and the method returns to 1204.

At 1208, the present apparatus selects a best candidate code that gives a maximum power in direction $\Phi_d$ from the candidate set $S_{\Phi_d}$.

At 1209, the present apparatus determines if $d \geq L-1$, where L is a total number of steering directions.

If $d<L-1$, the present apparatus updates the steering direction to $d=d+1$ at 1210 before returning to 1202. If $d \geq L-1$, the present system terminates the process.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, but does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method comprising:
   (a) turning on an antenna of an antenna array, wherein other antennas of the antenna array are turned off;
   (b) measuring power for the antenna at each phase of a phase array;
   (c) repeating step (b) for each antenna of the antenna array;
   (d) estimating gain error values for each antenna of the antenna array at each phase of the phase array based on the measured power for each antenna of the antenna array at each phase of the phase array;
   (e) selecting a first reference phase for a first antenna array and a second reference phase for a second antenna of the antenna array; and
   (f) estimating a phase of the first antenna based on the first reference phase and estimating a phase of the second antenna based on the first reference phase and the second reference phase.

2. The method of claim 1, wherein selecting the second reference phase comprises performing first power measurements with the second antenna turned on for each phase of the phase array and with the first antenna turned on at the first reference phase, while other antennas of the antenna array are turned off.

3. The method of claim 2, wherein the second reference phase is 90 degrees apart from the first reference phase.

4. The method of claim 3, further comprising performing second power measurements, wherein the first antenna is turned on at the first reference phase, and each antenna of the antenna array other than the first antenna and the second antenna is successively turned on one at a time at each phase of the phase array while remaining antennas of the antenna array are turned off;

performing third power measurements, wherein the second antenna is turned on at the second reference phase, and each antenna of the antenna array other than the first antenna and the second antenna is successively turned on one at a time at each phase of the phase array while remaining antennas of the antenna array are turned off; and estimating phases for each antenna of the antenna array other than the first antenna and the second antenna based on the second power measurements and the third power measurements.

5. The method of claim 4, further comprising determining a third reference phase of a third antenna of the antenna array using values of phase estimates made for the third antenna.

6. The method of claim 5, wherein the third reference phase is 90 degrees apart from the second reference phase.

7. The method of claim 6, further comprising:
performing fourth power measurements with the first antenna turned on at each phase of the phase array other than the first reference phase and the second antenna turned on at the second reference phase, while the other antennas of the antenna array are turned off;
performing fifth power measurements with the first antenna turned on at each phase of the phase array other than the first reference phase and the third antenna turned on at the third reference phase, while the other antennas of the antenna array are turned off; and
estimating phases for the first antenna based on the fourth power measurements and the fifth power measurements.

8. The method of claim 7, further comprising determining a fourth reference phase of the third antenna using the values of phase estimates made for the third antenna.

9. The method of claim 8, wherein the fourth reference phase is 90 degrees apart from the first reference phase.

10. The method of claim 9, further comprising:
performing sixth power measurements with the second antenna turned on at each phase of the phase array other than the second reference phase and the third antenna turned on at the fourth reference phase, while the other antennas of the antenna array are turned off; and
estimating phases for the second antenna based on the first power measurements and the sixth power measurements.

11. The method of claim 10, further comprising optimizing the estimated gain error values and phase error values for each phase of the phase array for each antenna of the antenna array by a least squared distance criteria between the first power measurements, the second power measurements, the third power measurements, the fourth power measurements, the fifth power measurements, the sixth power measurements, and expected power measurements based on estimated gain errors and estimated phase errors.

12. The method of claim 11, wherein optimizing the estimated gain error values and phase error values is based on a distance metric criteria between the first power measurements, the second power measurements, the third power measurements, the fourth power measurements, the fifth power measurements, the sixth power measurements, and the expected power measurements.

13. The method of claim 12, further comprising:
generating codewords based on the updated phases and gains for the antennas of the antenna array; and
generating a codebook from the codewords.

14. The method of claim 13, further comprising:
selecting a direction;
calculating powers of codewords in the selected direction based on the estimated gain error values and phase error values of the antennas of the antenna array; and
determining the codeword in the codebook that generates a maximum power in the selected direction.

15. An apparatus, comprising:
a power meter; and
a controller configured to (a) turn on an antenna of the antenna array, wherein other antennas of the antenna array are turned off;
(b) control the power meter to measure power for the antenna at each phase of a phase array;
(c) repeat step (b) for each antenna of the antenna array;
(d) estimate gain error values for each antenna of the antenna array at each phase of the phase array based on the measured power for each antenna of the antenna array at each phase of the phase array;
(e) selecting a first reference phase for a first antenna array and a second reference phase for a second antenna of the antenna array; and
(f) estimating a phase of the first antenna based on the first reference phase and estimate a phase of the second antenna based on the first reference phase and the second reference phase.

16. The apparatus of claim 15, wherein the controller is further configured to perform first power measurements with the second antenna turned on for each phase of the phase array and with the first antenna turned on at the first reference phase, while other antennas of the antenna array are turned off.

* * * * *